US011919737B2

(12) United States Patent
Uehara

(10) Patent No.: US 11,919,737 B2
(45) Date of Patent: Mar. 5, 2024

(54) SHEET FEEDING DEVICE AND IMAGE FORMING APPARATUS

(71) Applicant: CANON KABUSHIKI KAISHA, Tokyo (JP)

(72) Inventor: Tomoya Uehara, Suntou-gun (JP)

(73) Assignee: Canon Kabushiki Kaisha, Tokyo (JP)

(*) Notice: Subject to any disclaimer, the term of this patent is extended or adjusted under 35 U.S.C. 154(b) by 111 days.

(21) Appl. No.: 16/929,786

(22) Filed: Jul. 15, 2020

(65) Prior Publication Data

US 2021/0032055 A1 Feb. 4, 2021

(30) Foreign Application Priority Data

Aug. 2, 2019 (JP) ................................ 2019-143295

(51) Int. Cl.
*B65H 5/36* (2006.01)
*B65H 3/06* (2006.01)
(Continued)

(52) U.S. Cl.
CPC ............. *B65H 5/36* (2013.01); *B65H 3/0676* (2013.01); *B65H 5/062* (2013.01); *B65H 5/38* (2013.01);
(Continued)

(58) Field of Classification Search
CPC .......... B65H 1/04; B65H 3/06; B65H 3/5215; B65H 3/66; B65H 3/68; B65H 5/062; B65H 5/26; B65H 5/36; B65H 5/38; B65H 7/02; B65H 7/04; B65H 7/14; B65H 2402/441; B65H 2402/45; B65H 2404/61; B65H 2404/612; B65H 2404/65;
(Continued)

(56) References Cited

U.S. PATENT DOCUMENTS 6,011,948 A * 1/2000 Amano .................... B65H 9/06 271/245
2009/0166966 A1 * 7/2009 Nishikata ............... B65H 5/062 271/272
(Continued)

FOREIGN PATENT DOCUMENTS

JP 2004-361495 A 12/2004
JP 2013-028465 A 2/2013
(Continued)

*Primary Examiner* — Prasad V Gokhale
(74) *Attorney, Agent, or Firm* — Canon U.S.A., Inc. I.P. Division

(57) ABSTRACT

A sheet feeding device includes a detachable separation unit, a conveyance unit, a guide member, an urging member, and an opening and closing member. The feeding unit feeds a stored sheet. The separation unit separates sheets fed by the feeding unit one by one. The conveyance unit conveys the sheet. Urged by the urging member, the guide member guides the sheet toward the conveyance unit and rotates about a first rotating shaft. The opening and closing member opens and closes. In a state in which the opening and closing member is closed, the guide member is positioned in a first position in which the guide member forms a conveyance path. In a process in which the opening and closing member is opened, a free end of the guide member moves upwardly about the first rotating shaft, by using an urging force, from the first to a second position.

10 Claims, 12 Drawing Sheets

(51) Int. Cl.

| | |
|---|---|
| ***B65H 5/06*** | (2006.01) |
| ***B65H 5/38*** | (2006.01) |
| ***B65H 7/14*** | (2006.01) |
| ***G03G 15/00*** | (2006.01) |

(52) U.S. Cl.
CPC ........... *B65H 7/14* (2013.01); *G03G 15/6529* (2013.01); *B65H 2402/45* (2013.01); *B65H 2553/41* (2013.01)

(58) Field of Classification Search
CPC ........ B65H 2404/651; B65H 2405/332; B65H 2553/40; B65H 2553/41; B65H 2553/412; B65H 2601/321; B65H 2601/324
See application file for complete search history.

(56) References Cited

U.S. PATENT DOCUMENTS

| | | | | |
|---|---|---|---|---|
| 2014/0203503 | A1* | 7/2014 | Ishikura | B65H 5/062 271/273 |
| 2016/0209788 | A1* | 7/2016 | Ono | G03G 15/234 |
| 2020/0180883 | A1* | 6/2020 | Liou | B65H 1/04 |
| 2020/0209797 | A1* | 7/2020 | Ikegami | G03G 15/6552 |
| 2021/0032054 | A1* | 2/2021 | Nishii | B65H 5/38 |

FOREIGN PATENT DOCUMENTS

| | | | |
|---|---|---|---|
| JP | 2014-162618 | A | 9/2014 |
| JP | 2016-185854 | A | 10/2016 |

* cited by examiner

SHEET FEEDING DEVICE AND IMAGE FORMING APPARATUS

BACKGROUND

Field

The present disclosure relates to a sheet feeding device which feeds a sheet and an image forming apparatus including thereof.

Description of the Related Art

An image forming apparatus such as a copying machine and a printer includes an opening and closing door as an opening and closing member to expose a conveyance path for conveying a sheet and exposes the conveyance path by opening the opening and closing door.

Japanese Patent Application Laid-Open No. 2013-028465 discusses a method for retracting a guide member for guiding a sheet from a conveyance path by opening an opening and closing door.

The guide member according to Japanese Patent Application Laid-Open No. 2013-028465 includes a rotating shaft on an upstream side in a conveyance direction and is supported to freely rotate between a guide position at which the conveyance path is formed and a release position at which the conveyance path is released. The opening and closing door includes a cam surface that abuts on the guide member, and scoops and moves the guide member to the guide position in a case where a closing operation is performed from an open state.

However, in a configuration according to Japanese Patent Application Laid-Open No. 2013-028465, the guide member is positioned down in the lower portion in a state in which the opening and closing door is released. In such a state that the guide member is positioned down in the lower portion, it is necessary to avoid the guide member in attaching and detaching a conveyance member and a separation member that are arranged below the guide member, which can thereby impair usability.

SUMMARY

The present disclosure is directed to a sheet feeding device and an image forming apparatus that can reduce impairment of usability due to a movement of a guide member.

According to an aspect of the present disclosure, a sheet feeding device includes a storage unit configured to store a sheet, a feeding unit configured to feed the sheet stored in the storage unit, a separation unit configured to separate sheets fed by the feeding unit one by one, wherein the separation unit is detachable from the sheet feeding device, a conveyance unit located on a downstream side of the separation unit in a sheet conveyance direction and above the separation unit and configured to convey the sheet, a guide member located on the downstream side of the separation unit in the sheet conveyance direction and above the separation unit and configured to form a conveyance path to guide the sheet toward the conveyance unit, wherein the guide member is configured to rotate about a first rotating shaft, an urging member configured to urge the guide member, and an opening and closing member configured to face the guide member and to be opened and closed with respect to a main body unit of the sheet feeding device, wherein, in a state in which the opening and closing member is closed with respect to the main body unit, the guide member is positioned in a first position in which the guide member forms the conveyance path, and wherein, in a process in which the opening and closing member is opened, a free end of the guide member moves upwardly about the first rotating shaft, by using an urging force of the urging member, from the first position to a second position.

Further features of the present disclosure will become apparent from the following description of exemplary embodiments with reference to the attached drawings.

DESCRIPTION OF THE EMBODIMENTS

Exemplary embodiments of the present disclosure will be descried below with reference to the attached drawings.

Figure 1:
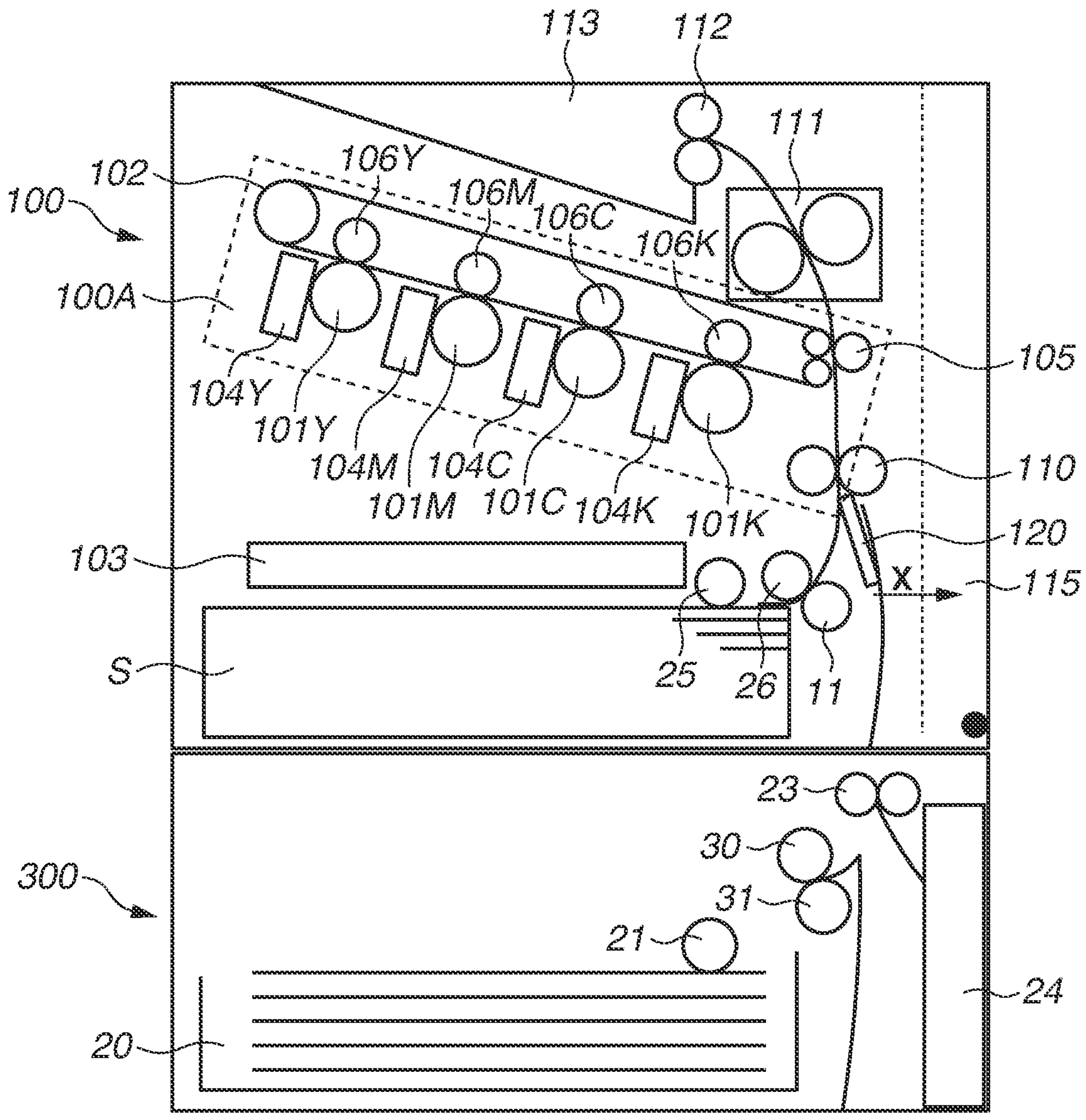
FIG. 1 is a schematic view of a sheet feeding device and an image forming apparatus.

FIG. 1 is a schematic view of a sheet feeding device and an image forming apparatus according to a first exemplary embodiment. In the present exemplary embodiment, a color laser printer (hereinbelow, referred to as a printer 100) adopting an electrophotographic method will be described as an example of an image forming apparatus with reference to the attached drawings. The printer 100 adopts the electrophotographic method. However, the present disclosure can be applied to an ink-jet method without being limited to the electrophotographic method. A sheet feeding device 300 which feeds a sheet to the printer 100 is connected below the printer 100 as an optional device. According to the present exemplary embodiment, the sheet feeding device 300 is the optional device but may be configured as a part of the printer 100.

As illustrated in FIG. 1, the printer 100 includes an image forming unit 100A. The image forming unit 100A includes four photosensitive drums 101Y, 101M, 101C, and 101K which form toner images in four colors of yellow, magenta, cyan, and black, respectively. The image forming unit 100A further includes an endless intermediate transfer belt 102. When the endless intermediate transfer belt 102 is brought into contact with these four photosensitive drums, the toner images formed on the four photosensitive drums 101Y, 101M, 101C, and 101K are primarily transferred onto the endless intermediate transfer belt 102. The image forming unit 100A further includes primary transfer rollers 106Y, 106M, 106C, and 106K which press the intermediate transfer belt 102 from an inner peripheral side thereof onto the photosensitive drums 101Y, 101M, 101C, and 101K. The primary transfer rollers 106Y, 106M, 106C, and 106K are applied with a transfer voltage from a transfer power source (not illustrated) and generate a potential difference between each of the photosensitive drums 101Y, 101M, 101C, and 101K and the intermediate transfer belt 102. By the potential differences, the toner images are primarily transferred from the photosensitive drums 101Y, 101M, 101C, and 101K to the intermediate transfer belt 102. The image forming unit 100A further includes a secondary transfer roller 105 which secondarily transfers the images transferred to the intermediate transfer belt 102 to a sheet S.

If an image forming operation is started in the image forming unit 100A, a laser scanner 103 irradiates the photosensitive drums 101Y, 101M, 101C, and 101K which are charged to a constant potential with light corresponding to an image signal. Accordingly, electrostatic latent images are formed on the photosensitive drums 101Y, 101M, 101C, and 101K.

Next, the electrostatic latent images are developed by toner stored in developing cartridges 104Y, 104M, 104C, and 104K, and thus toner images (visible images) formed on the photosensitive drums 101Y, 101M, 1010, and 101K. The toner images formed on the photosensitive drums 101Y, 101M, 101C, and 101K are primarily transferred to the intermediate transfer belt 102, and then the toner images on the intermediate transfer belt 102 are conveyed to a secondary transfer portion by the intermediate transfer belt 102.

In parallel with the above-described toner image forming operation, the sheet S stacked on a feeding cassette is fed by a feeding roller 25. In a case where a plurality of sheets S is conveyed in an overlapped state, the sheets S are separated one by one by a conveyance roller 26 and a separation roller 11 and conveyed downstream in a sheet conveyance direction. The sheet S is conveyed by a registration roller 110 which performs skew correction to the secondary transfer portion formed by a nip between the intermediate transfer belt 102 and the secondary transfer roller 105. Since it is necessary to align a position of the sheet S in the sheet conveyance direction with the toner image formed on the intermediate transfer belt 102, a conveyance speed of the registration roller 110 is controlled to match a timing with the sheet S. Then, the secondary transfer roller 105 is applied with a secondary transfer voltage at the secondary transfer portion, and the toner image on the intermediate transfer belt 102 is transferred onto the sheet S.

The sheet S to which the toner image is transferred is then conveyed to a fixing unit 111 and heated and pressed in the fixing unit 111, so that the toner image is fixed to the sheet S. After fixing, the sheet S is discharged to a discharge unit 113 on an upper part of the printer 100 by a discharge roller 112. The printer 100 further includes an opening and closing door 115 as an opening and closing member which can be opened and closed. By opening the opening and closing door 115, the sheet S stuck in the printer 100 can be removed (jam recovery).

The sheet feeding device 300 includes a conveyance path 22 (FIG. 2) through which the sheet S is conveyed from a storage unit 20 which can store a large quantity of sheets S to the printer 100 by a feeding roller 21 as a feeding member. In a case where another sheet feeding device 300 (a second sheet feeding device) is connected below the sheet feeding device 300, the conveyance path 22 includes another conveyance path for conveying the sheet S conveyed from the second sheet feeding device to the printer 100. The sheet S is conveyed to the printer 100 by a pair of conveyance rollers 23 as a conveyance unit. The sheet feeding device 300 includes an opening and closing door 24 as an opening and closing member. The conveyance path 22 is exposed by opening the opening and closing door 24, so that jam recovery and attachment and detachment of a replacement part such as the feeding roller 21 can be performed.

Figure 2:
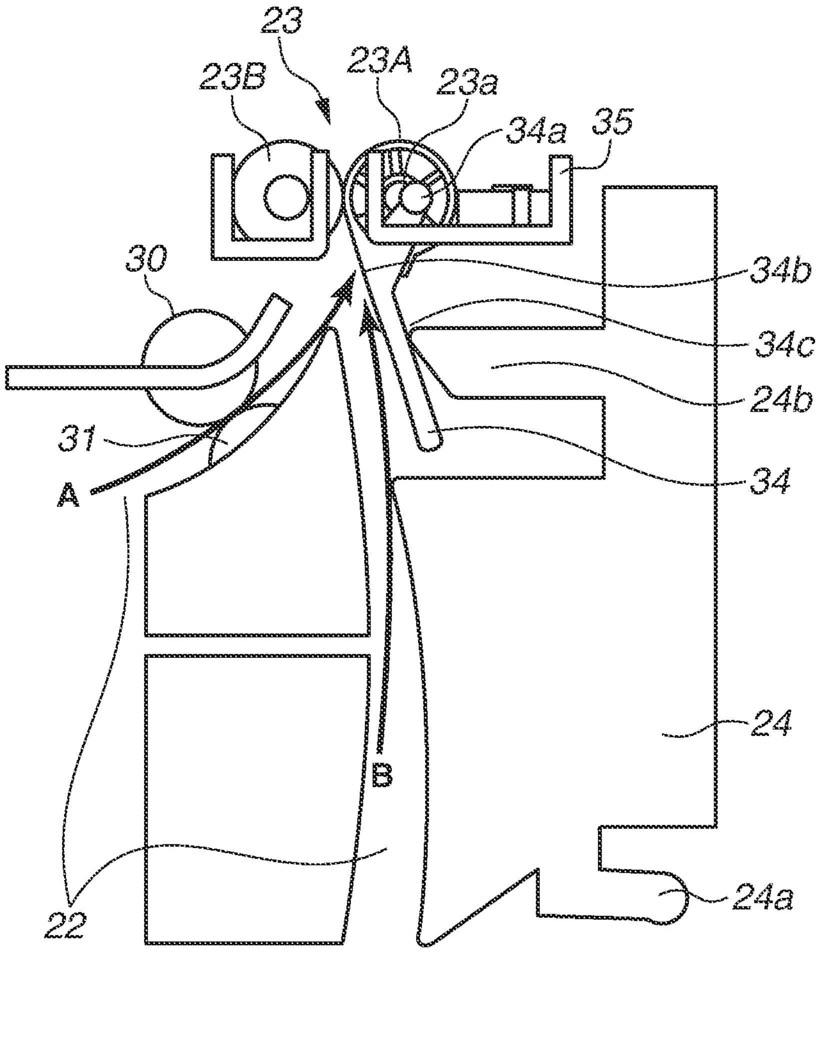
FIG. 2 is a partially enlarged sectional view of the sheet feeding device in a closed state in which an opening and closing member is closed.
Figure 3:
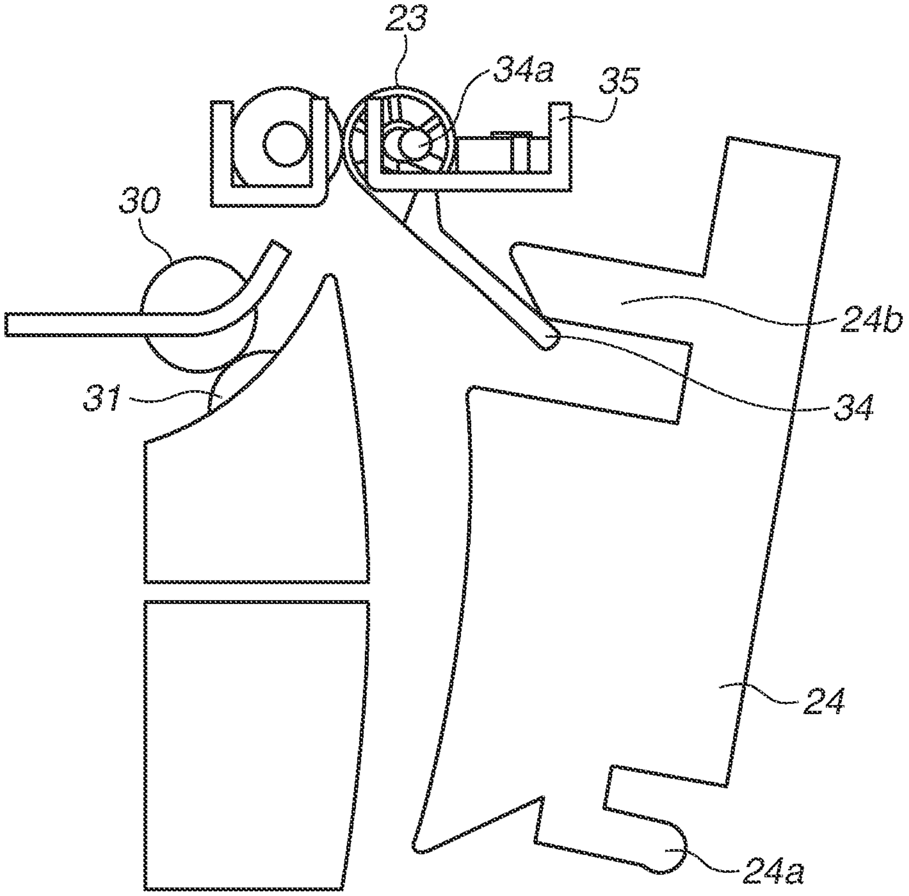
FIG. 3 is a partially enlarged sectional view of the sheet feeding device in which the opening and closing member is in a halfway state.
Figure 4:
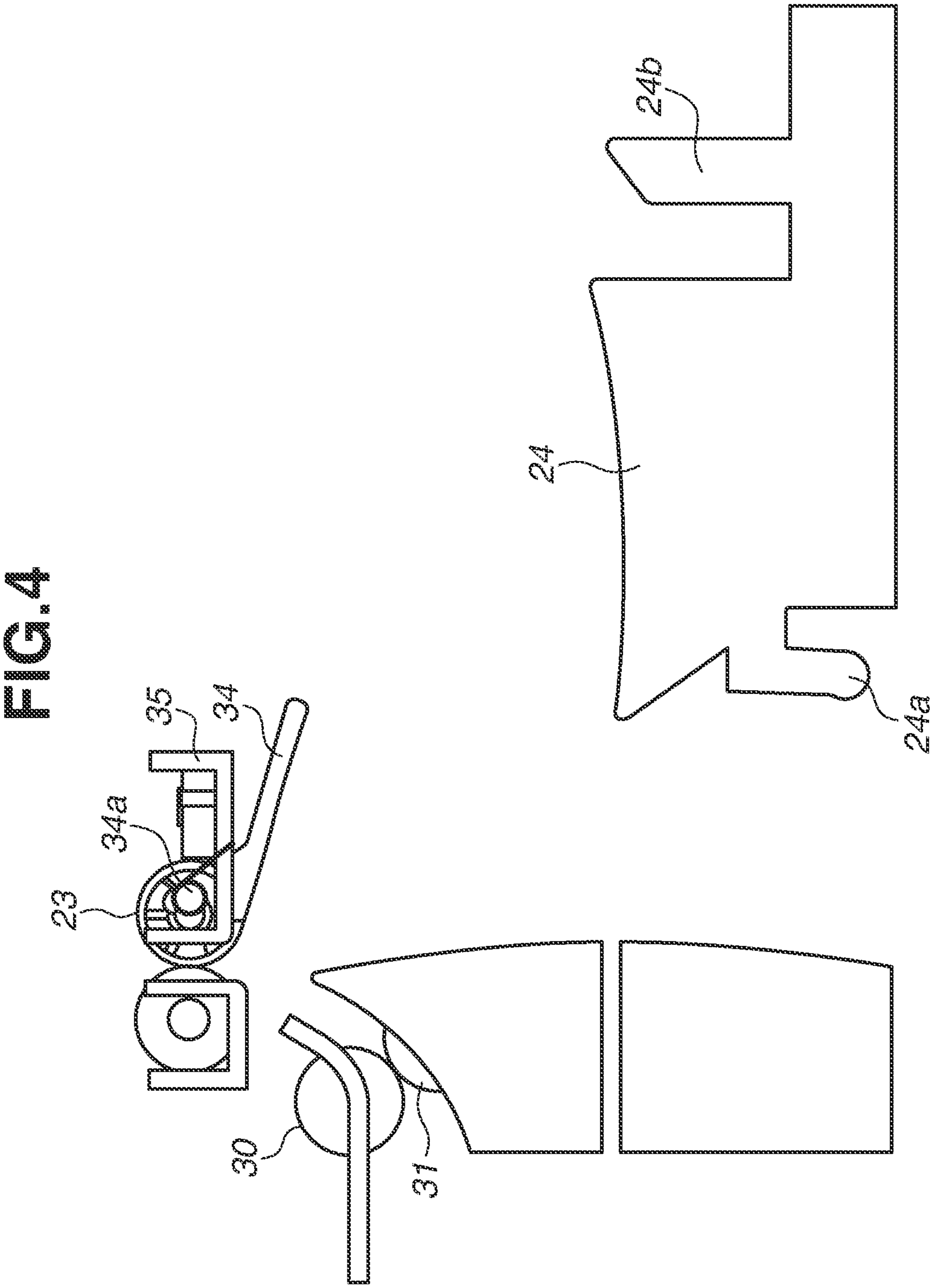
FIG. 4 is a partially enlarged sectional view of the sheet feeding device in an open state in which the opening and closing member is opened.

FIG. 2 is a partially enlarged sectional view of the sheet feeding device 300 in a closed state in which the opening and closing door 24 is closed. FIG. 4 is a partially enlarged sectional view of the sheet feeding device 300 in an open state in which the opening and closing door 24 is opened. FIG. 3 is a partially enlarged sectional view of the sheet feeding device 300 in a halfway state between the states illustrated in FIG. 2 and FIG. 4.

As illustrated in FIG. 2, the conveyance path 22 of the sheet feeding device 300 includes a conveyance path A for conveying the sheet S in an direction A and a conveyance path B for conveying the sheet S conveyed from another sheet feeding device 300 arranged below the sheet feeding device 300 in a direction B. The sheet feeding device 300 includes the conveyance roller 30 as a conveyance member for conveying the sheet S fed by the feeding roller 21 and a separation roller 31 for separating sheets one by one. The sheet feeding device 300 further includes a guide member 34 which rotates in conjunction with the opening and closing door 24. The guide member 34 guides the sheet S to the pair of conveyance rollers 23 and is supported by a holding member 35 to be rotatable between a guide position (a first position) illustrated in FIG. 2 and a release position (a second position) illustrated in FIG. 4. The guide member 34 according to the present exemplary embodiment on which each of the sheet S conveyed through the conveyance path A and the sheet S conveyed through the conveyance path B abuts has a function of guiding the sheet S abutting thereon to the pair of conveyance rollers 23.

A rotating shaft 34*a* of the guide member 34 is arranged near the pair of conveyance rollers 23. In other words, the guide member 34 includes the rotating shaft 34*a* (a first rotating shaft) on the downstream side in the sheet conveyance direction. According to the present exemplary embodiment, the rotating shaft 34*a* is coaxially arranged with a rotating shaft 23*a* (a second rotating shaft) of the conveyance roller 23A which is arranged on the side where the opening and closing door 24 is arranged in a conveyance roller 23A and a conveyance roller 23B which form the pair of conveyance rollers 23. According to the present exemplary embodiment, the conveyance roller 23B is a first roller, and the conveyance roller 23A is a second roller which forms a conveyance nip portion with the conveyance roller 23B. The rotating shaft 34*a* may not be located on an axis line of the rotating shaft 23*a* of the conveyance roller 23A and may be located, for example, to be within the roller diameter of the conveyance roller 23A.

Figure 5:
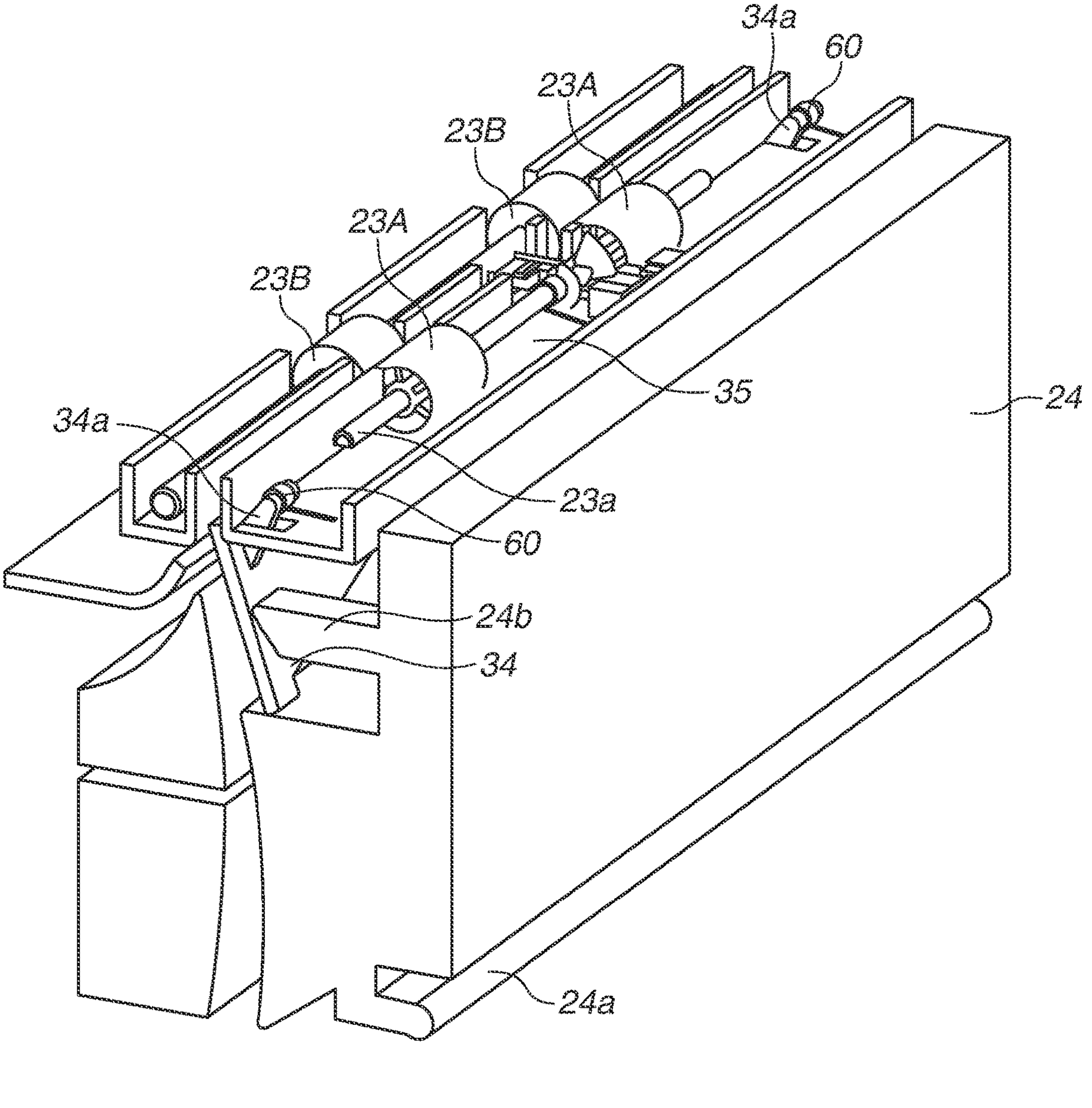
FIG. 5 is a perspective view of the sheet feeding device in the closed state in which the opening and closing member is closed.

The guide member 34 further includes an urging member which applies an urging force to the guide member 34 such that the guide member 34 rotates from the guide position to the release position. FIG. 5 corresponds to FIG. 2 and is a perspective view of the sheet feeding device 300 in the closed state in which the opening and closing door 24 is closed. As described with reference to FIG. 5, the guide member 34 is urged to move upwardly using an urging force of a torsion coil spring 60 as the urging member.

The conveyance roller 30 is unitized with the feeding roller 21 as a feeding roller unit 38 (refer to FIGS. 6 and 7) so that a user can replace the conveyance roller 30. In other words, the feeding roller unit 38 is a feeding unit configured to feed the sheet stored in the storage unit and is configured to be detachable from the sheet feeding device 300 (a main body unit of the sheet feeding device).

The separation roller 31 is unitized as a separation roller unit 39 (refer to FIGS. 6 and 7) so that a user can replace the separation roller 31. In other words, the separation roller unit 39 is a separation unit and is configured to be detachable from the sheet feeding device 300 (the main body unit of the sheet feeding device).

The opening and closing door 24 includes an opening and closing shaft 24*a* which supports the opening and closing door 24 to be rotatable with respect to the sheet feeding device 300, a cam surface 24*b* (a contact portion) which causes the guide member 34 to move with the opening and closing door 24, and a lock mechanism (not illustrated) which holds the closed state with respect to the sheet feeding device 300. The guide member 34 is in contact with the cam surface 24*b* of the opening and closing door 24 to maintain the guide position in the closed state of the opening and closing door 24.

In the closed state of the opening and closing door 24, a holding force of the lock mechanism needs, or should be, to be greater than force in an opening direction to prevent the opening and closing door 24 from opening. The force in the opening direction includes the urging force of the urging member and force received from the sheet S at the time of sheet conveyance. The urging force of the urging member has a negligibly small value compared to the holding force of the lock mechanism.

The force received from the sheet can be reduced by arranging a sheet abutting position 34*b* at which a leading edge of the sheet abuts on the guide member 34 on a downstream side in the sheet conveyance direction of a cam abutting position 34*c* at which the cam surface 24*b* abuts on the guide member 34. Accordingly, the force which the opening and closing door 24 receives from the sheet S can be reduced, and the holding force of the lock mechanism can be minimized.

Next, an opening and closing operation of the opening and closing door 24 will be described. As illustrated in FIG. 3, in a process of opening the opening and closing door 24, the cam surface 24*b* is retracted, and a portion of the guide member 34 on the upstream side thereof in the sheet conveyance direction begins to rise by the urging force of the torsion coil spring 60. As illustrated in FIG. 4, the cam surface 24*b* is separated from the guide member 34 in the open state, and the guide member 34 holds the release position by abutting on the holding member 35. In a process of closing the opening and closing door 24, the cam surface 24*b* presses down the guide member 34 by abutting thereon and holds the guide member 34 at the guide position in the closed state.

According to the above-described configuration, as the opening and closing door 24 is moved in the opening direction, the guide member 34 moves in conjunction with the opening and closing door 24. The rotating shaft 34*a* of the guide member 34 is arranged on a downstream end side with respect to a free end of the guide member 34 (an upstream end in the sheet conveyance direction), so that the free end of the guide member 34 can be moved upwardly in conjunction with the movement of the opening and closing door 24. According to the above-described configuration, since the guide member 34 is retracted upwardly in a state in which the opening and closing door 24 is opened, jam recovery performance can be improved since a user does not need to move the guide member 34.

In addition, the rotating shaft 34*a* is coaxially arranged to the rotating shaft 23*a* of the conveyance roller 23A, so that a leading end position (a position of the free end) of the guide member 34 can be highly accurately determined with respect to the pair of conveyance rollers 23. Therefore, the present exemplary embodiment can highly accurately determine the leading end position of the guide member 34 with respect to the pair of conveyance rollers 23 while improving the jam recovery performance.

Figure 6:
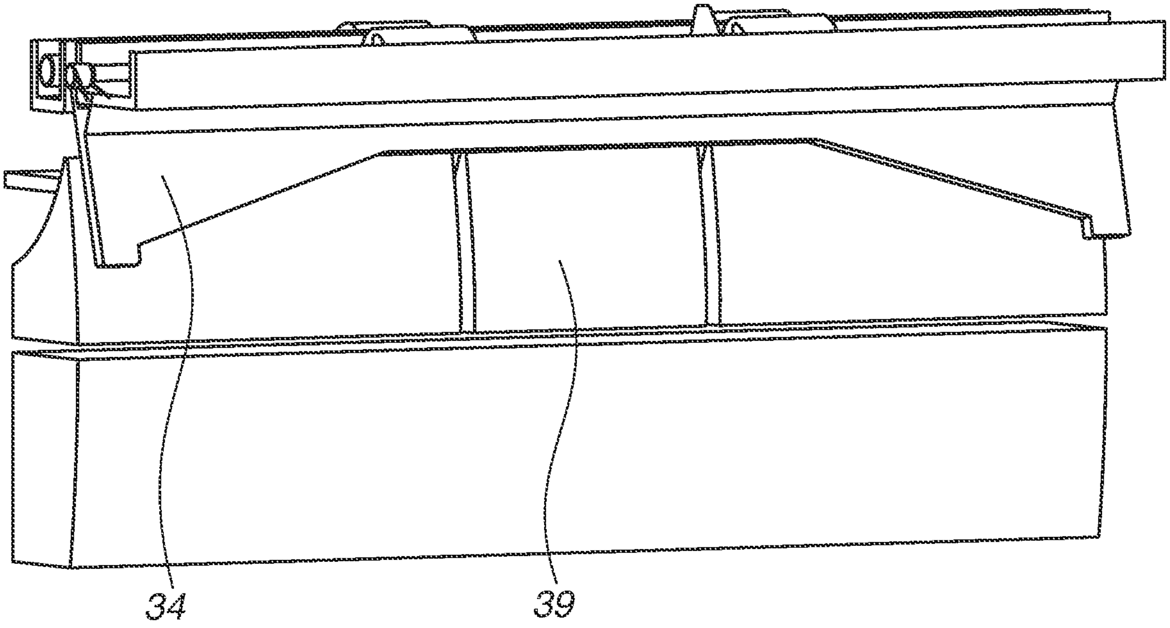
FIG. 6 is a perspective view of a relationship of a separation unit, a feeding unit, and a guide member.
Figure 7:
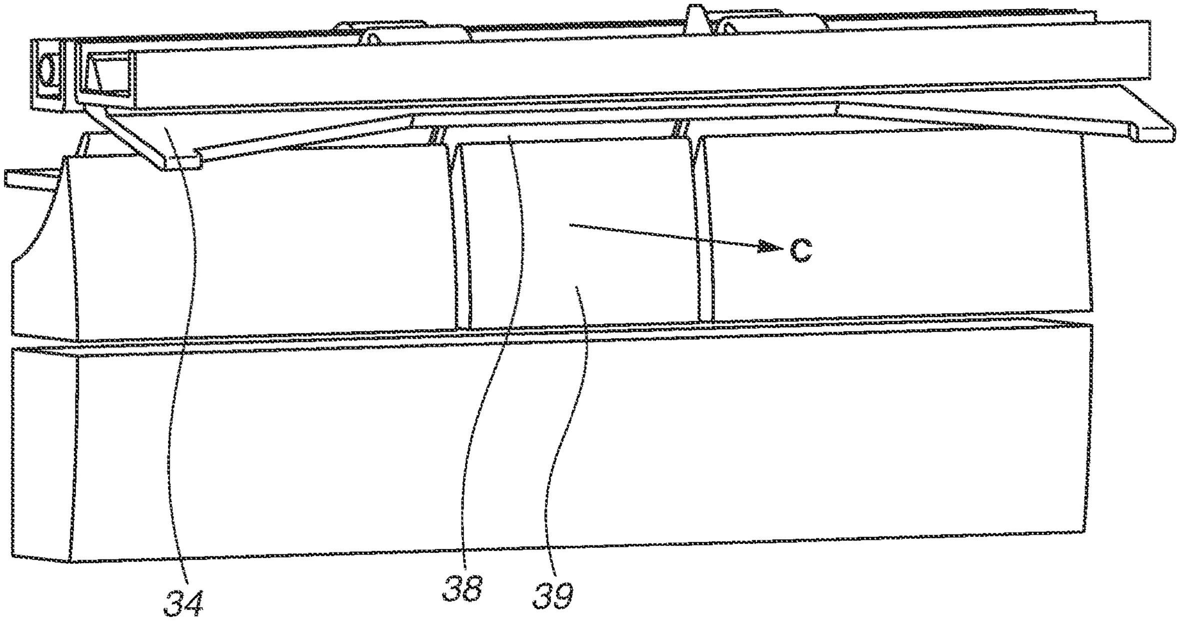
FIG. 7 is a perspective view of the relationship of the separation unit, the feeding unit, and the guide member.

The length of the guide member 34 in the sheet conveyance direction may be changed at a center portion and end portions thereof in a sheet width direction intersecting with the sheet conveyance direction. FIGS. 6 and 7 are perspective views of the guide member 34. The length of the guide member 34 in the sheet conveyance direction is shorter at the center portion than at the end portions in the sheet width direction. FIG. 6 illustrates a state in which the opening and closing door 24 is closed, and FIG. 7 illustrates a state in which the opening and closing door 24 is opened. According to the present exemplary embodiment, the separation roller unit 39 as the separation unit is moved in a direction C indicated by an arrow, and thus the separation roller unit 39 can be detached from the sheet feeding device 300 for replacement. Generally, the separation roller 31 included in the separation roller unit 39 is arranged on the center side in the sheet width direction, so that the separation roller unit 39 is arranged on the center side in the sheet width direction. A length of a portion corresponding to the separation roller unit 39 is shortened in the guide member 34, so that, when the guide member 34 is retracted upwardly in a state in which the opening and closing door 24 is opened, the separation roller unit 39 can be exposed. According to the above-described configuration, operability in replacing the separation roller unit 39 can be improved. A configuration of positioning the separation roller unit 39 with respect to the sheet feeding device 300 and a configuration of releasing positing thereof according to the present exemplary embodiment are described with reference to FIGS. 8A, 8B, and 9A to 9C.

Figure 8A:
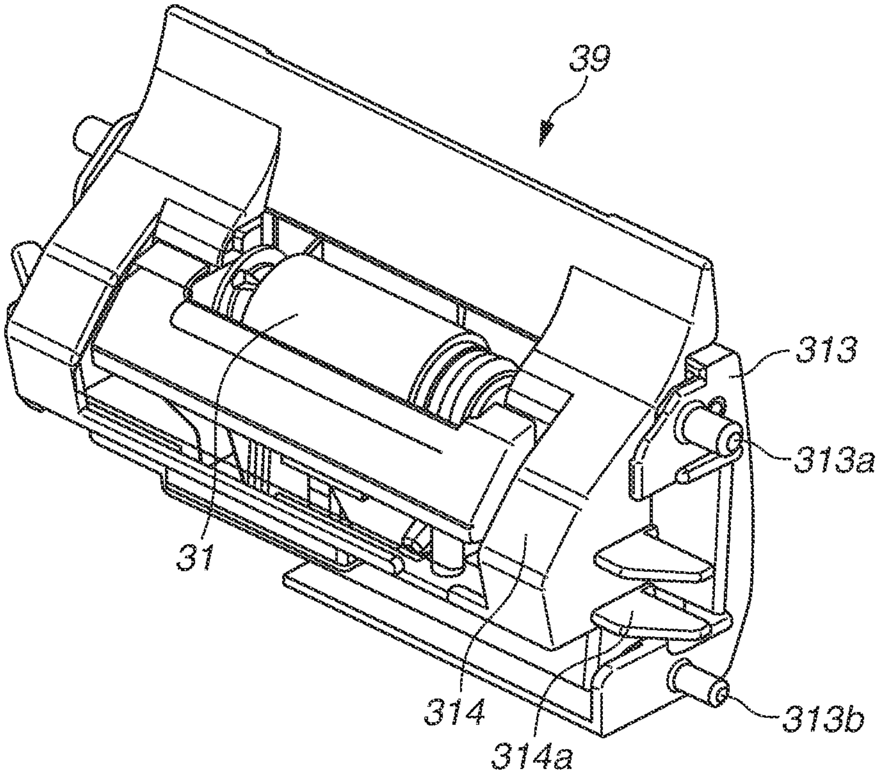
FIG. 8A is a perspective view of the separation unit.
Figure 8B:
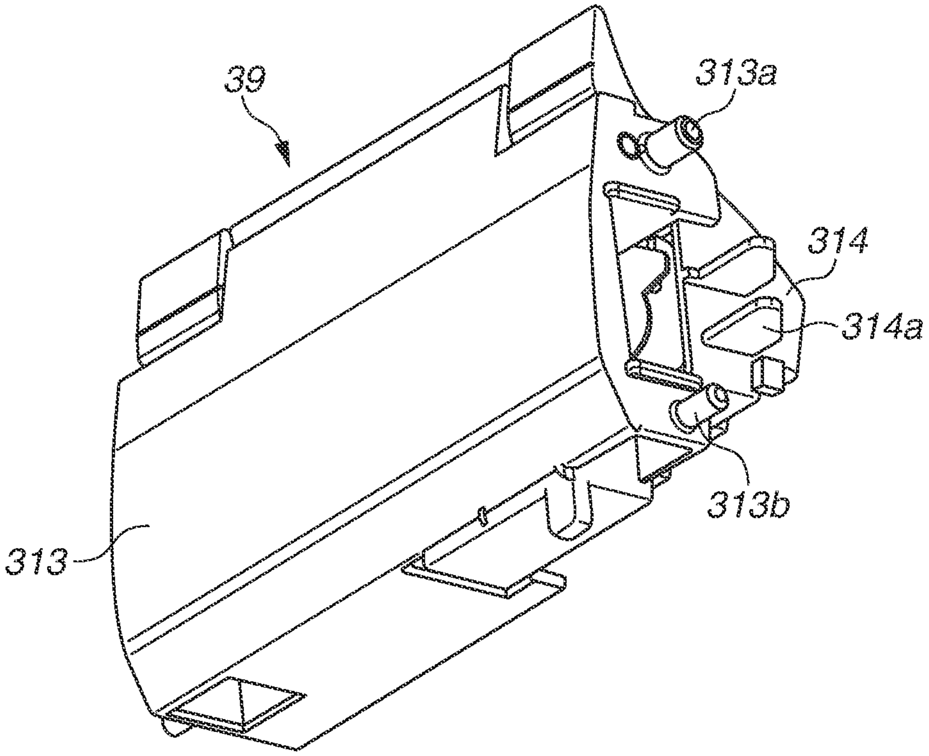
FIG. 8B is a perspective view of the separation unit viewed from an opposite side of FIG. 8A.
Figure 9A:
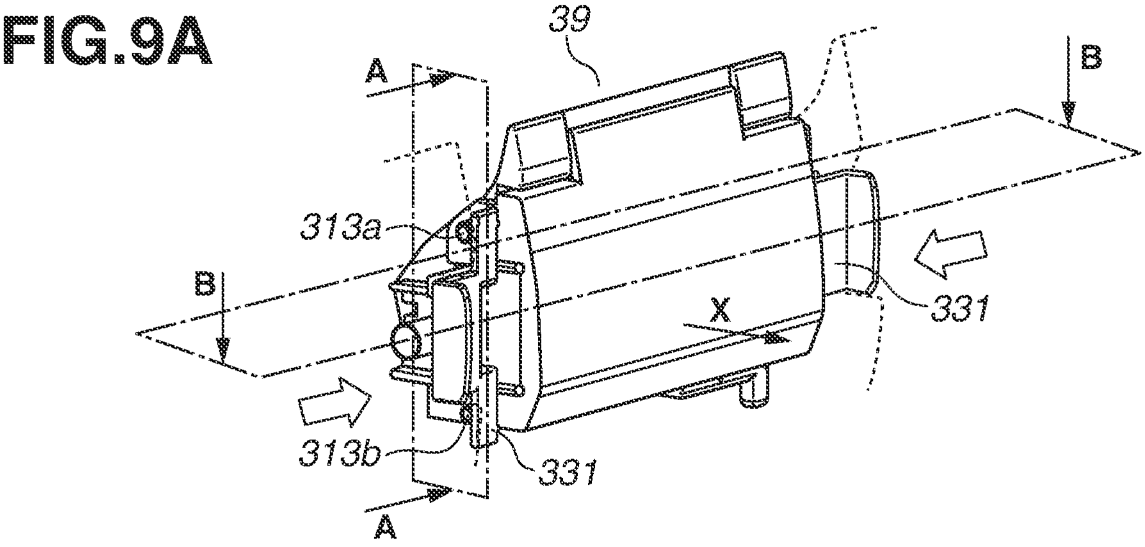
FIG. 9A is a perspective view of the separation unit n a mounted state.
Figure 9B:
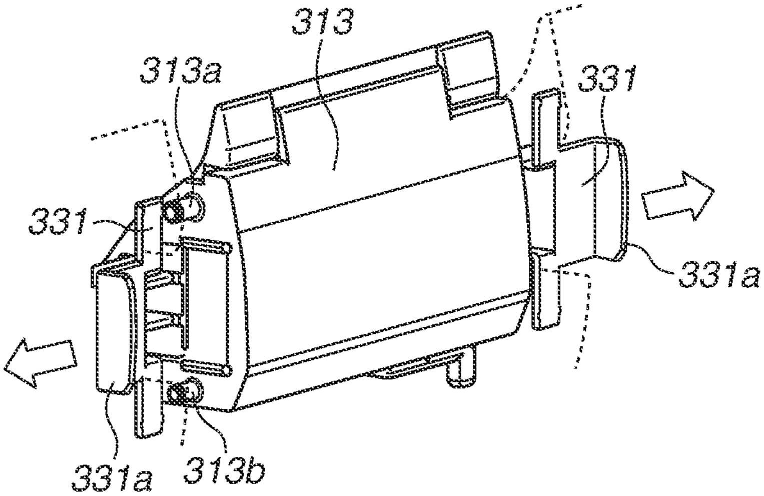
FIG. 9B is a perspective view of a state in which an engaging member moves to a second position (a retracted position).
Figure 9C:
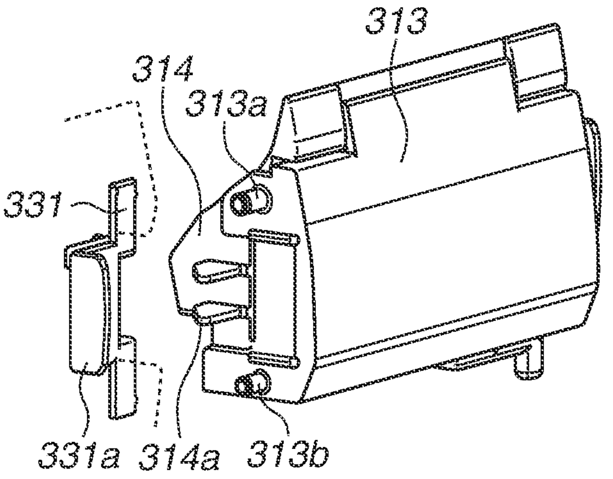
FIG. 9C is a perspective view of the separation unit in a state detached from the sheet feeding device.
Figure 10:
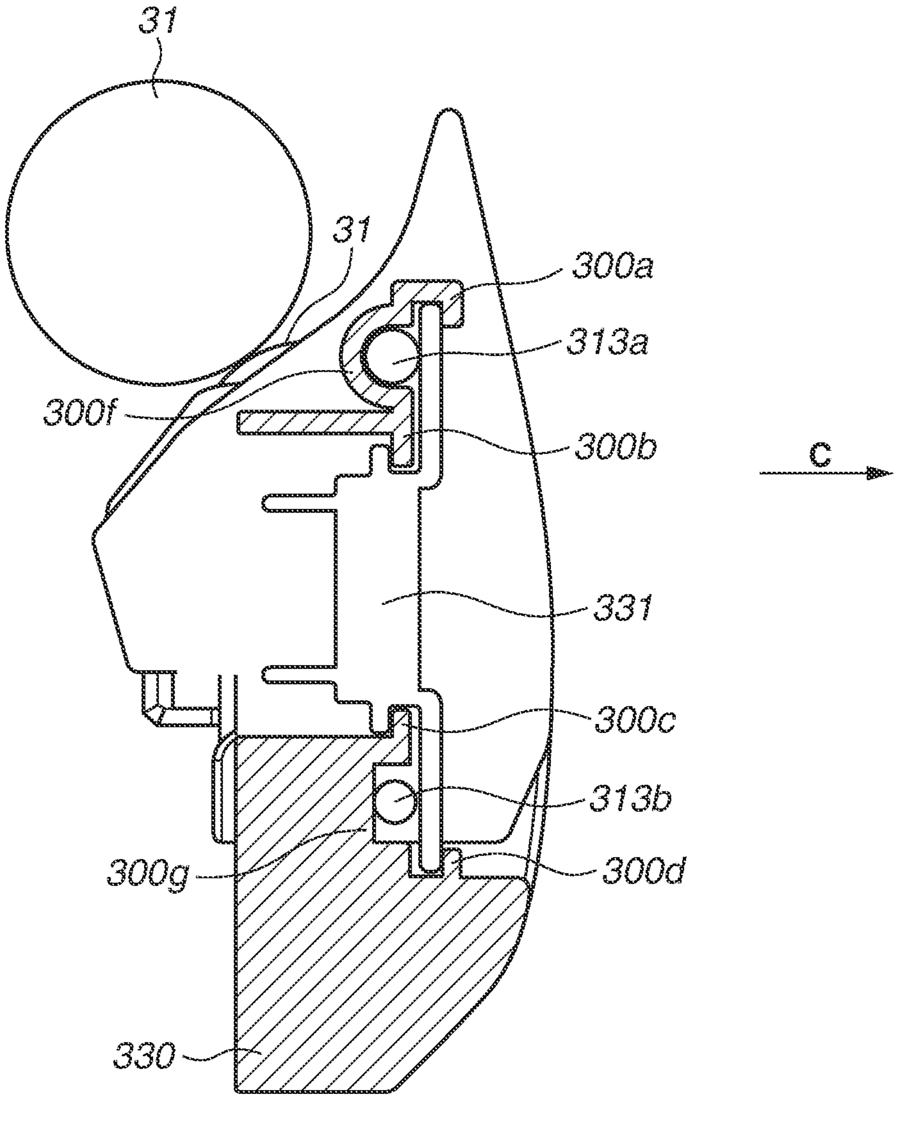
FIG. 10 is a cross-sectional view of the separation unit in the mounted state.

FIG. 8A is a perspective view of the separation roller unit 39. FIG. 8B is a perspective view of the separation roller unit 39 viewed from an opposite side of FIG. 8A. FIGS. 9A to 9C are schematic views illustrating a movement of a separation shutter 331 as an engaging member included in the sheet feeding device 300 and attaching and detaching operations of the separation roller unit 39. FIG. 9A illustrates a mounted state of the separation roller unit 39. FIG. 9B illustrates a state in which the separation shutter 331 moves to a second position (a retracted position). FIG. 9C illustrates a state in which the separation roller unit 39 is detached from the sheet feeding device 300. FIG. 10 is a schematic cross-sectional view of an engagement state of the separation shutter 331 and projection portions 3113*a* and 313*b*. FIG. 10 is a view in an A-A cross in FIG. 9A.

As described above, the separation roller unit 39 is unitized with the separation roller 31, a separation base 313 as a facing member which faces the opening and closing door 24, and a separation cover 314 which covers the separation roller 31. The unitization in such a configuration keeps an operator such as a user and a service person from touching an internal part and thereby facilitates handling.

The separation base 313 is provided with a pair of the projection portions 313*a* and 313*b* each on both sides, as first positioning portions for positioning with respect to the sheet feeding device 300. The separation cover 314 includes a cam portion 314*a*. The cam portion 314*a* is an engaged portion which abuts on the separation shutter 331 included in the sheet feeding device 300 and moves the separation shutter 331 at a time when the separation roller unit 39 is attached, as described below. In other words, the separation cover 314 is an engaged member (a slide member) including the cam portion 314*a* as the engaged portion and also functions as a cover member for coveting the separation roller 31.

The sheet feeding device 300 is provided with the separation shutter 331. The separation shutter 331 engages with rail portions 300*a* to 300*d* of the sheet feeding device 300 as illustrated in FIGS. 9A to 9C and is slidably held with respect to the sheet feeding device 300 while being regulated in its movement in a right-and-left direction in FIGS. 9A to 9C. A slide direction intersects with a detachment direction of the separation roller unit 39. Further, the separation shutters 331 are urged by a shutter spring (not illustrated) in directions indicated by arrows in FIG. 9A. A position of the separation shutter 331 in FIG. 9A is regarded as a first position. In a case where the separation shutter 331 is in the first position, the projection portions 313*a* and 313*b* of the separation base 313 in the separation roller unit 39 engage with recess portions 300*f* and 300*g* as second positioning portions on a side of the sheet feeding device 300 as illustrated in FIG. 10.

The separation shutter 331 engages with the projection portions 313*a* and 313*b* of the separation base 313 and regulates a movement of the separation roller unit 39 in a direction X. This indicates the mounted state of the separation roller unit 39 to the sheet feeding device 300.

The separation shutters 331 are configured to move from the first position in directions indicated by arrows in FIG. 9B so that an operator such as a user and a service person can move the separation shutters 331 in the directions indicated by the arrows in FIG. 9B by holding a grip portion 331*a*. When the operator moves the separation shutters 331 in the directions indicated by the arrows in FIG. 9B, engagement between the separation shutters 331 and the projection portions 313*a* and 313*b* of the separation base 313 is released, and the separation roller unit 39 becomes movable in the direction X. A position of the separation shutter 331 at this time is regarded as the second position.

In a case where the separation shutter 331 reaches the second position, and the engagement between the separation shutter 331 and the projection portions 313*a* and 313*b* of the separation base 313 is released, the separation roller unit 39 can be detached as illustrated in FIG. 9C. At this time, the opening and closing door 24 is in the open state and the guide member 34 is retracted upwardly as illustrated in FIG. 4, so that the separation roller unit 39 can be easily detached.

Figure 11A:
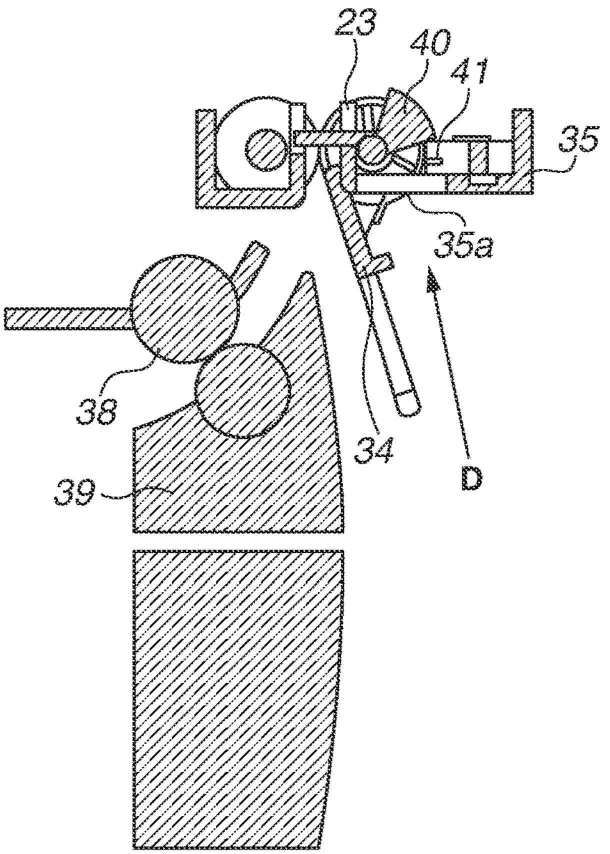
FIGS. 11A and 11B are partially enlarged sectional views of a relationship of a detection member, a holding member, and the guide member.
Figure 11B:
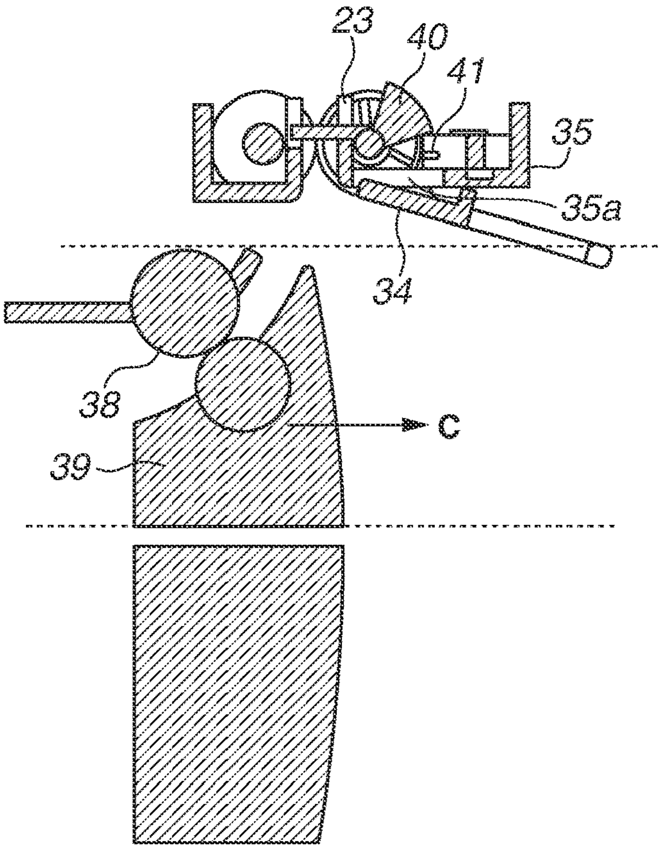

Further, as illustrated in FIGS. 11A and 11B, a sensor flag 40 as a detection member for detecting the sheet passing through the conveyance path 22 and a photosensor 41 for detecting transmission of the sensor flag 40 are provided near the pair of conveyance rollers 23. The photosensor 41 is held by the holding member 35, and the holding member 35 includes an opening portion 35*a* for avoiding interference with of the sensor flag 40 when the sensor flag 40 is rotating.

If a part of a user's body is charged with static electricity at the time of jam recovery or replacement of the separation roller unit 39, the static electricity affects the photosensor 41 from a direction D (refer to FIG. 11A) and may deteriorate a function of the photosensor 41. In order to avoid this event, a grounding member for static electricity protection is required. In contrast, according to the first exemplary embodiment, the guide member 34 covers the opening portion 35*a* at the release position as illustrated in FIG. 11B. Accordingly, the grounding member for static electricity protection is not required.

The feeding roller unit 38 is arranged on a position corresponding to the separation roller unit 39 and can be drawn in the direction C (refer to FIG. 7) as with the separation roller unit 39. At this time, the guide member 34 is retracted upwardly and thus is unlikely to affect an operation for drawing out the feeding roller unit 38.

The sheet feeding device 300 has been described above as an example, but the present exemplary embodiment can be applied to the printer 100. The printer 100 includes a configuration in which the opening and closing door 115 is opened and closed to attach and detach the separation roller 11 and the conveyance roller 26 as with the sheet feeding device 300. At this time, a conveyance guide 120 (refer to FIG. 1) located above the separation roller 11 and the conveyance roller 26 may be moved upwardly as with the guide member 34.

Figure 12A:
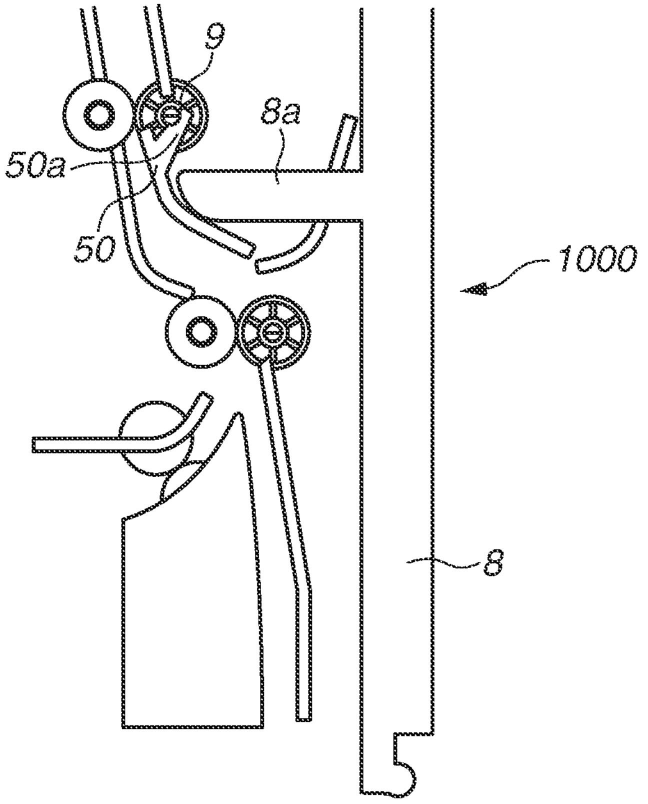
FIGS. 12A and 12B are partially enlarged sectional views of a modification of an image forming apparatus.
Figure 12B:
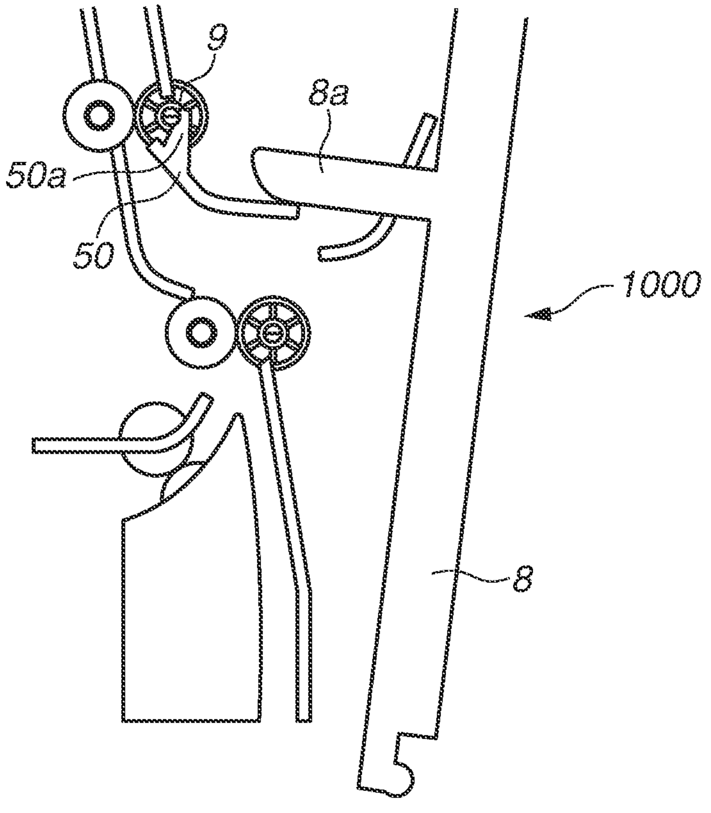

The present exemplary embodiment can be also applied to an image forming apparatus 1000 as illustrated in FIGS. 12A and 12B. The image forming apparatus 1000 includes a guide member 50 at a position facing an opening and closing door 8 as an opening and closing member. The guide member 50 is rotatable about a rotating shaft 50*a*. The image forming apparatus 1000 in FIGS. 12A and 12B includes the guide member 50 on an upstream side of a registration roller 9 for synchronizing a sheet conveyance timing with an image forming timing. The guide member 50 comes into contact with an opening and closing door 8*a* and moves in conjunction with the opening and closing door 8 as with the guide member 34. The configuration according to the first exemplary embodiment can be applied to the above-described configuration.

According to the present disclosure, a sheet feeding device and an image forming apparatus can be provided which can reduce impairment of usability by moving a guide member upwardly.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™) a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-143295, filed Aug. 2, 2019, which is hereby incorporated by reference herein in its entirety.

What is claimed is:

1. A sheet feeding device comprising:

a storage unit configured to store a sheet;

a feeding unit configured to feed the sheet stored in the storage unit;

a separation unit configured to separate sheets fed by the feeding unit one by one, wherein the separation unit is detachable from the sheet feeding device;

a conveyance unit located on a downstream side of the separation unit in a sheet conveyance direction and above the separation unit and configured to convey the sheet;

a guide member located on the downstream side of the separation unit in the sheet conveyance direction and above the separation unit and configured to form a conveyance path to guide the sheet toward the conveyance unit, wherein the guide member is configured to rotate about a first rotating shaft;

an urging member configured to urge the guide member; and an opening and closing member configured to face the guide member and to be opened and closed with respect to a main body unit of the sheet feeding device, wherein, in a state in which the opening and closing member is closed with respect to the main body unit, the guide member is positioned in a first position in which the guide member forms the conveyance path, wherein, in a process in which the opening and closing member is opened, a free end of the guide member moves, by using an urging force of the urging member, from the first position to a second position above the first position and, when the free end of the guide member is positioned at the second position, the free end of the guide member is positioned farther from the separation unit with respect to a horizontal direction than the free end of the guide member positioned at the first position, wherein the free end of the guide member, when positioned at the first position, is at a position that interferes with an attachment/detachment locus of the separation unit, wherein the free end of the guide member, when positioned at the second position, is at a position that does not interfere with the attachment/detachment locus of the separation unit, wherein the conveyance unit includes a first roller and a second roller configured to form a conveyance nip portion with the first roller, and wherein the second roller is configured to rotate about a second rotating shaft, and the second rotating shaft and the first rotating shaft partially overlap when viewed from an axial direction of the first rotating shaft.

2. The sheet feeding device according to claim 1, further comprising a holding member configured to hold the second roller and the guide member, wherein the guide member includes the guide member free end as an upstream end in the sheet conveyance direction, and the first rotating shaft provided on a downstream end side is configured to be held by the holding member.

3. The sheet feeding device according to claim 2, wherein the opening and closing member includes an opening and closing shaft for opening and closing the opening and closing member with respect to the sheet feeding device, and includes a contact portion configured to come into contact with the guide member and to move the guide member from the second position to the first position, and wherein the guide member is positioned by the contact portion in a state in which the guide member is in the first position, and a position at which the contact portion comes into contact with the positioned guide member is on an upstream side of a position at which a leading edge of the sheet comes into contact with the positioned guide member in the sheet conveyance direction.

4. The sheet feeding device according to claim 2, further comprising:

a detection member configured to detect the sheet passing through the conveyance path; and a photosensor configured to detect a movement of the detection member, wherein the photosensor is held by the holding member, and the holding member includes an opening portion to be covered by the guide member in a state in which the guide member is in the second position.

5. The sheet feeding device according to claim 1, wherein the separation unit is arranged on a center portion in a sheet width direction intersecting with the sheet conveyance direction, and wherein a length of the guide member in the sheet conveyance direction is shorter at a portion corresponding to the center portion than at a portion corresponding to an end portion in the sheet width direction.

6. An image forming apparatus comprising:

a storage unit configured to store a sheet;

a feeding unit configured to feed the sheet stored in the storage unit;

a separation unit configured to separate sheets fed by the feeding unit one by one, wherein the separation unit is detachable from the image forming apparatus;

an image forming unit configured to form an image on the sheet separated one by one by the separation unit;

a conveyance unit located on a downstream side of the separation unit in a sheet conveyance direction and above the separation unit and configured to convey the sheet;

a guide member located on the downstream side of the separation unit in the sheet conveyance direction and above the separation unit and configured to form a conveyance path to guide the sheet toward the conveyance unit, wherein the guide member is configured to rotate about a first rotating shaft;

an urging member configured to urge the guide member; and an opening and closing member configured to face the guide member and to be opened and closed with respect to a main body unit of the image forming apparatus, wherein, in a state in which the opening and closing member is closed with respect to the main body unit, the guide member is positioned in a first position in which the guide member forms the conveyance path, wherein, in a process in which the opening and closing member is opened, a free end of the guide member moves, by using an urging force of the urging member, from the first position to a second position above the first position and, when the free end of the guide member is positioned at the second position, the free end of the guide member is positioned farther from the separation unit with respect to a horizontal direction than the free end of the guide member positioned at the first position, wherein the free end of the guide member, when positioned at the first position, is at a position that interferes with an attachment/detachment locus of the separation unit, wherein the free end of the guide member, when positioned at the second position, is at a position that does not interfere with the attachment/detachment locus of the separation unit, wherein the conveyance unit includes a first roller and a second roller configured to form a conveyance nip portion with the first roller, and wherein the second roller is configured to rotate about a second rotating shaft, and the second rotating shaft and the first rotating shaft partially overlap when viewed from an axial direction of the first rotating shaft.

7. The image forming apparatus according to claim 6, further comprising a holding member configured to hold the second roller and the guide member, wherein the guide member includes the guide member free end as an upstream end in the sheet conveyance direction, and the first rotating shaft provided on a downstream end side is configured to be held by the holding member.

8. The image forming apparatus according to claim 7, wherein the opening and closing member includes an opening and closing shaft for opening and closing the opening and closing member with respect to the image forming apparatus, and includes a contact portion configured to come into contact with the guide member and to move the guide member from the second position to the first position, and wherein the guide member is positioned by the contact portion in a state in which the guide member is in the first position, and a position at which the contact portion comes into contact with the positioned guide member is on an upstream side of a position at which a leading edge of the sheet comes into contact with the positioned guide member in the sheet conveyance direction.

9. The image forming apparatus according to claim 7, further comprising:

a detection member configured to detect the sheet passing through the conveyance path; and a photosensor configured to detect a movement of the detection member, wherein the photosensor is held by the holding member, and the holding member includes an opening portion to be covered by the guide member in a state in which the guide member is in the second position.

10. The image forming apparatus according to claim 6, wherein the separation unit is arranged on a center portion in a sheet width direction intersecting with the sheet conveyance direction, and wherein a length of the guide member in the sheet conveyance direction is shorter at a portion corresponding to the center portion than at a portion corresponding to an end portion in the sheet width direction.

* * * * *